United States Patent
Gunnarsson et al.

(10) Patent No.: US 9,762,358 B2
(45) Date of Patent: Sep. 12, 2017

(54) DATA RETRANSMISSION SCHEME

(75) Inventors: Fredrik Gunnarsson, Linkoping (SE); Pál Frenger, Linköping (SE); Niclas Wiberg, Linköping (SE)

(73) Assignee: IDTP Holdings, Inc., Wilmington, DE (US)

(*) Notice: Subject to any disclaimer, the term of this patent is extended or adjusted under 35 U.S.C. 154(b) by 71 days.

(21) Appl. No.: 13/147,487

(22) PCT Filed: Feb. 18, 2009

(86) PCT No.: PCT/SE2009/050176
§ 371 (c)(1),
(2), (4) Date: Aug. 2, 2011

(87) PCT Pub. No.: WO2010/095986
PCT Pub. Date: Aug. 26, 2010

(65) Prior Publication Data
US 2011/0286538 A1    Nov. 24, 2011

(51) Int. Cl.
*H04L 1/18* (2006.01)
*H04L 1/16* (2006.01)

(52) U.S. Cl.
CPC .......... *H04L 1/1838* (2013.01); *H04L 1/1607* (2013.01); *H04L 1/1825* (2013.01); *H04L 1/1854* (2013.01); *H04L 1/1864* (2013.01)

(58) Field of Classification Search
CPC ... H04L 1/1607; H04L 1/1838; H04L 1/1864; H04L 1/1854
USPC ........ 370/352, 400, 392; 455/424, 522, 509; 375/227, 340, 259
See application file for complete search history.

(56) References Cited

U.S. PATENT DOCUMENTS

| | | | |
|---|---|---|---|
| 6,771,700 B1 | 8/2004 | Razoumov et al. | |
| 8,151,158 B2 * | 4/2012 | Mudulodu | H03M 13/3715 455/7 |
| 2002/0094810 A1 | 7/2002 | Hassan | |

(Continued)

FOREIGN PATENT DOCUMENTS

| | | |
|---|---|---|
| EP | 15 57 968 | 7/2005 |
| WO | WO 00/70813 | 11/2000 |
| WO | WO 2008/038104 | 4/2008 |

OTHER PUBLICATIONS

International Search Report for PCT/SE2009/050176, mailed Nov. 3, 2009.

(Continued)

*Primary Examiner* — Khaled Kassim
(74) *Attorney, Agent, or Firm* — Condo Roccia Koptiw LLP (57) ABSTRACT

Disclosed are improved retransmission schemes. In one embodiment, a retransmission method includes: receiving, at a protocol layer in a receiver, a data block transmitted from a protocol layer in a transmitter; determining that it is not possible to decode the data block; determining that it is not probable that the data block can be decoded; signaling, from the protocol layer in the receiver, to the protocol layer in the transmitter first feedback information indicating that the data block was received; and signaling, from the protocol layer in the receiver, to the protocol layer in the transmitter second feedback information including information related to the reception time of the data block and indicating that the data block is aborted.

8 Claims, 10 Drawing Sheets

(56) References Cited

U.S. PATENT DOCUMENTS

| | | | |
|---|---|---|---|
| 2002/0172208 A1* | 11/2002 | Malkamaki | 370/400 |
| 2003/0217319 A1* | 11/2003 | Tripathi et al. | 714/751 |
| 2006/0023815 A1* | 2/2006 | Malm | 375/340 |
| 2007/0060167 A1* | 3/2007 | Damnjanovic | H04W 52/24 455/450 |
| 2007/0118786 A1* | 5/2007 | Lim | H03M 13/1105 714/751 |
| 2008/0109693 A1* | 5/2008 | Maas | H04L 1/1812 714/748 |
| 2009/0022063 A1 | 1/2009 | Ju et al. | |
| 2009/0049362 A1* | 2/2009 | Mudulodu | H03M 13/6306 714/755 |
| 2009/0086845 A1* | 4/2009 | Demirhan | H04L 1/0003 375/295 |
| 2009/0137252 A1* | 5/2009 | Masseroni | H04L 47/10 455/446 |
| 2010/0202288 A1* | 8/2010 | Park | H04W 48/08 370/230 |
| 2011/0051661 A1* | 3/2011 | Venkob | H04L 1/1685 370/328 |

OTHER PUBLICATIONS

Written Opinion of the International Searching Authority for PCT/SE2009/050176, mailed Nov. 3, 2009.

English translation of the Chinese Office Action mailed Sep. 24, 2013 in Chinese Patent Application 200980156961.9.

$3^{rd}$ Generation Partnership Project (3GPP), TS 36.300, V8.2.0, "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Sep. 2007, 109 pages.

$3^{rd}$ Generation Partnership Project (3GPP); R2-081727, "UL HARQ handling when P-HICH collides with measurement gap", NTT DoCoMo, Inc., 3GPP TSG RAN WG2, Meeting # 61 bis, Shenzhen, China, Mar. 31-Apr. 4, 2008, 3 pages.

* cited by examiner

DATA RETRANSMISSION SCHEME

This application is the U.S. national phase of International Application No. PCT/SE2009/050176, filed 18 Feb. 2009, which designated the U.S., the entire contents of each of which are hereby incorporated by reference.

TECHNICAL FIELD

The present invention relates to the field of mobile communications. More specifically, aspects of the invention relate to an improved data retransmission scheme in a radio access network.

BACKGROUND

Retransmission schemes are important for communications over unreliable communication links. A communication link can be unreliable if, for example, (a) the link consists of several links connected by forwarding nodes (e.g., routers or gateways) and one of those forwarding nodes is unable to forward data or (b) the link has a varying link quality (e.g., the link is a radio link) that prevents the intended receiver from correctly decoding the transmitted data. The case considered here is the latter. Several means are designed to counteract the radio link quality variations, which includes retransmissions as well as transmitter power control, channel coding, and combinations thereof.

A retransmission scheme adopted by some networks (e.g., High Speed Packet Access (HSPA) and Long Term Evolution (LTE)) is based on an N-channel stop and wait protocol that is implemented in a media access control (MAC) layer. In such a protocol in an LTE environment, the MAC layer transmits N blocks of coded data in N contiguous subframes. By the time of the $(N+1)^{th}$ subframe, the MAC layer in the receiver should have responded whether it was able to detect and decode the first data block or not. The reason for the N parallel processes to handle data is to allow time for the receiver to detect, decode and report positive acknowledgement (ACK) or negative acknowledgement (NACK). The ACK and NACK may be transmitted using a single bit.

If the receiver indicates that it was not able to decode the first data block (e.g., the receiver transmits a NACK to the transmitter), the MAC layer in the transmitter will "retransmit" the data block in the $(N+1)^{th}$ subframe. That is, the MAC layer will transmit in the $(N+1)^{th}$ subframe the data block again as if it were a new data block and/or information to assist the MAC layer in the receiver in decoding the data block (e.g., other coded bits that strengthen the coding of the data block).

The maximally allowed number of retransmissions K is configured by higher protocol layers. If the data block is not correctly decoded after K retransmissions, a NACK is sent to an automatic repeat request (ARQ) process of a radio link control (RLC) layer in the transmitter so that the data block can be retransmitted at the RLC layer, possibly after some re-segmentation (i.e., the size of the data block may be different).

The RLC layer is configured to ensure in-sequence delivery of data blocks to higher layers. This means that if a data block is missing, subsequent correctly received data blocks have to wait until the missing data block has arrived. This delay can be considerable if the number of channels N and the max number of retransmission attempts K are large. Thus, if the data rate and code protection assigned for a transmission badly matches the radio link conditions, then RLC may have to wait a long time before the data block is correctly received (e.g., at least (N*k+1) subframes+RLC processing time).

What is desired are improved retransmission schemes to overcome the above and/or other disadvantages of conventional retransmission schemes.

SUMMARY

In one aspect, the invention provides a retransmission method. In some embodiments, this method includes the following steps: (1) receiving, at a protocol layer (e.g., a MAC layer) in a receiver (e.g., base station or mobile terminal), a data block transmitted from a corresponding protocol layer (e.g., a MAC layer) in a transmitter (e.g., base station or mobile terminal); (2) determining that it is not possible to decode the data block; (3) determining that it is not probable that the data block can be decoded even if the corresponding protocol layer in the transmitter retransmits the data block to the protocol layer in the receiver one or several times; (4) signaling, from the protocol layer in the receiver, to the corresponding protocol layer in the transmitter first feedback information indicating that the data block was received; and (5) signaling, from the protocol layer in the receiver, to the corresponding protocol layer in the transmitter second feedback information pertaining to the data block, the second feedback information including information related to the reception time of the data block and indicating that the data block is aborted.

In some embodiments, the step of determining that it is not probable that the data block can be decoded comprises calculating a value related to the probability of decoding the data block after one or several retransmissions from the transmitter. The calculating step may include: determining or estimating a value related to a radio condition; and calculating the value related to the probability of decoding the data block based, at least in part, on the determined or estimated value. In some embodiments, the value related to the radio condition is a value identifying a signal-to-interference (SIR) ratio (e.g., an estimate of an average SIR).

In some embodiments, the calculating step comprises monitoring soft bit decision metrics and using the monitored soft bit decision metrics to determine whether a decoding attempt was close to succeeding. The calculating step may also include using the monitored soft bit decision metrics to determine whether a decoding attempt that failed was closer to succeeding than a previous decoding attempt.

In some embodiments, the step of signaling the second feedback information comprises transmitting to the transmitter a channel state report that includes the second feedback information. In some embodiments, the second feedback information comprises a dedicated control element (e.g., a dedicated MAC control element) and the first feedback information consists of a single bit indicating either an ACK or a NACK.

In some embodiments, the second feedback information is received by the transmitter after the first feedback information is received by the transmitter and the second feedback information comprises reception time information indicating the time at which the protocol layer in the receiver received the data block from the corresponding protocol layer in the transmitter. The transmitter may be configured to use the reception time information to determine the data block to which the second feedback information pertains. The transmitter and receiver may have a common time reference on the protocol layer. When signaling the second feedback information in relation to a data block, it is preferred to also signal ACK using the first feedback information to the same data block (e.g., the first feedback information may consist of a single bit indicating an ACK).

In some embodiments, the transmitter is configured to retransmit the data block by transmitting the data block again as if it were a new data block and/or transmitting information related to the data block to assist the protocol layer in the receiver in decoding the data block. Advantageously, the transmission format used to transmit the data block again may be adapted to determined radio conditions.

In some embodiments, in response to receiving the second feedback information, the corresponding protocol layer in the transmitter informs a second protocol layer (e.g., an RLC layer) in the transmitter that the data block has been aborted, and, in response, this second protocol layer identifies other data blocks related to the aborted data block. In some embodiments, the aborted data block belongs to a protocol layer data unit and the second protocol layer identifies all other data blocks that belong to said protocol layer data unit. The protocol layer data unit may have been received by the second protocol layer from a third protocol layer (e.g., a network layer) on the transmitter side.

In another aspect, the present invention provides an improved communication device. In some embodiments, the communication device includes: a receiver; a transmitter; a data storage system; and a data processing system operable to: determine that it is not possible to decode a data block transmitted from a protocol layer in a transmitter to a protocol layer in the communication device; determine that it is not probable that the data block can be decoded even if the protocol layer in the transmitter retransmits the data block to the communication device one or several times; signal to the protocol layer in the transmitter first feedback information indicating that the data block was received; and signal to the protocol layer in the transmitter second feedback information pertaining to the data block in response to a determination that it is not probable that the data block can be decoded, the second feedback information including information related to the reception time of the data block and indicating that the data block is aborted.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
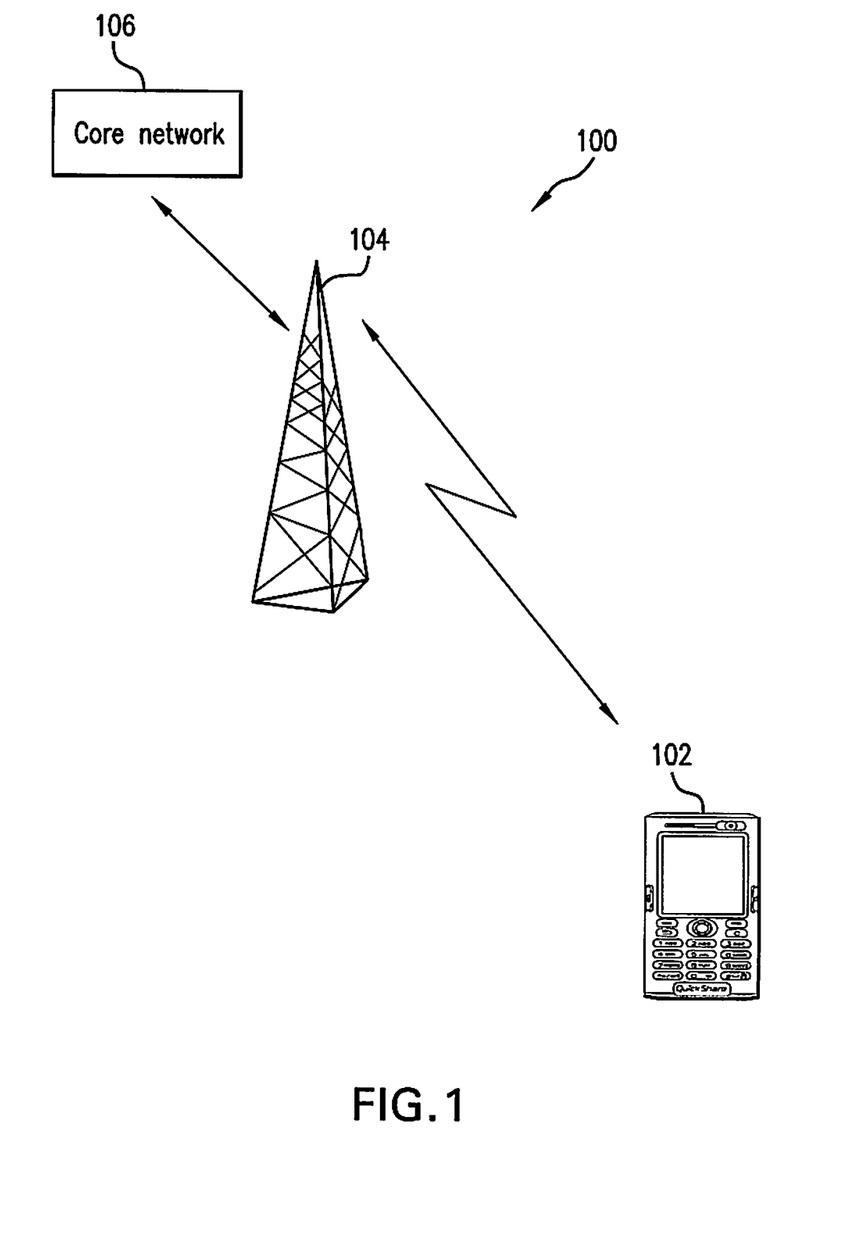
FIG. 1 illustrates a portion of a mobile communication network.

Referring now to FIG. 1, FIG. 1 illustrates a portion of a mobile communication network 100. As illustrated in FIG. 1, a mobile terminal 102 (a.k.a., user equipment (UE) 102) enables a user to access, via base station 104, services offered by an operator's core network 106. Base station 104, as is well known to those of ordinary skill in the art, handles radio transmission and reception within on or more cells (i.e., geographical area). In an LTE environment, base station 104 is referred to as an evolved NodeB (eNB).

Figure 2:
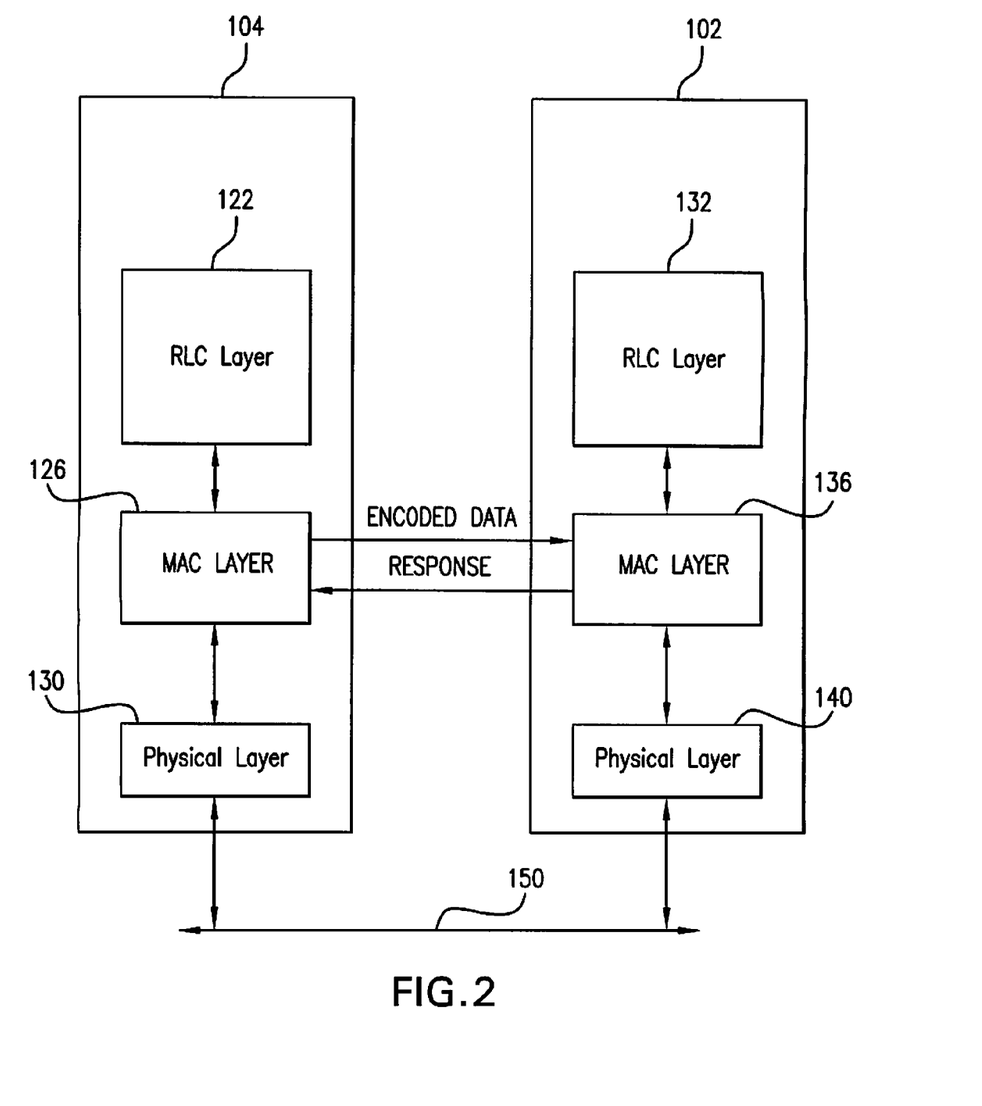
FIG. 2 illustrates a functional block diagram of some components of a UE and a functional block diagram of some components of a base station.

Referring now to FIG. 2, FIG. 2 illustrates a functional block diagram of some components of UE 102 and a functional block diagram of some components of base station 104. As shown in FIG. 2, base station 104 includes an RLC layer 122(a), a MAC layer 126(a) and a physical layer 130(a). Likewise, UE 102 includes an RLC layer 122(b), a MAC layer 126(b) and a physical layer 130(b). Although not shown, there may be one or more higher layers above an RLC layer 122.

As further shown in FIG. 2, a MAC layer in one communication device (e.g., MAC layer 122(a) or MAC layer 122(b) of UE 102), which is termed the transmit device or transmitter, may transmit encoded data to a MAC layer in another communication device, which is termed the receiving device or receiver (e.g., MAC layer 122(a) or MAC layer 122(b)). The MAC layer in the receiver is configured to detect and decode the transmitted encoded data and to transmit a response to the MAC layer in the transmitter. For example, the MAC layer in the receiver transmits a positive acknowledgement (ACK) to the MAC layer in the transmitter in response to successfully decoding the data, but, if the receiver detects the data and is not able to decode the data, the MAC layer in the receiver transmits a negative acknowledgement (NACK) to the MAC layer in the transmitter. Typically, the ACKs and NACKs are transmitted using a single bit.

Figure 3:
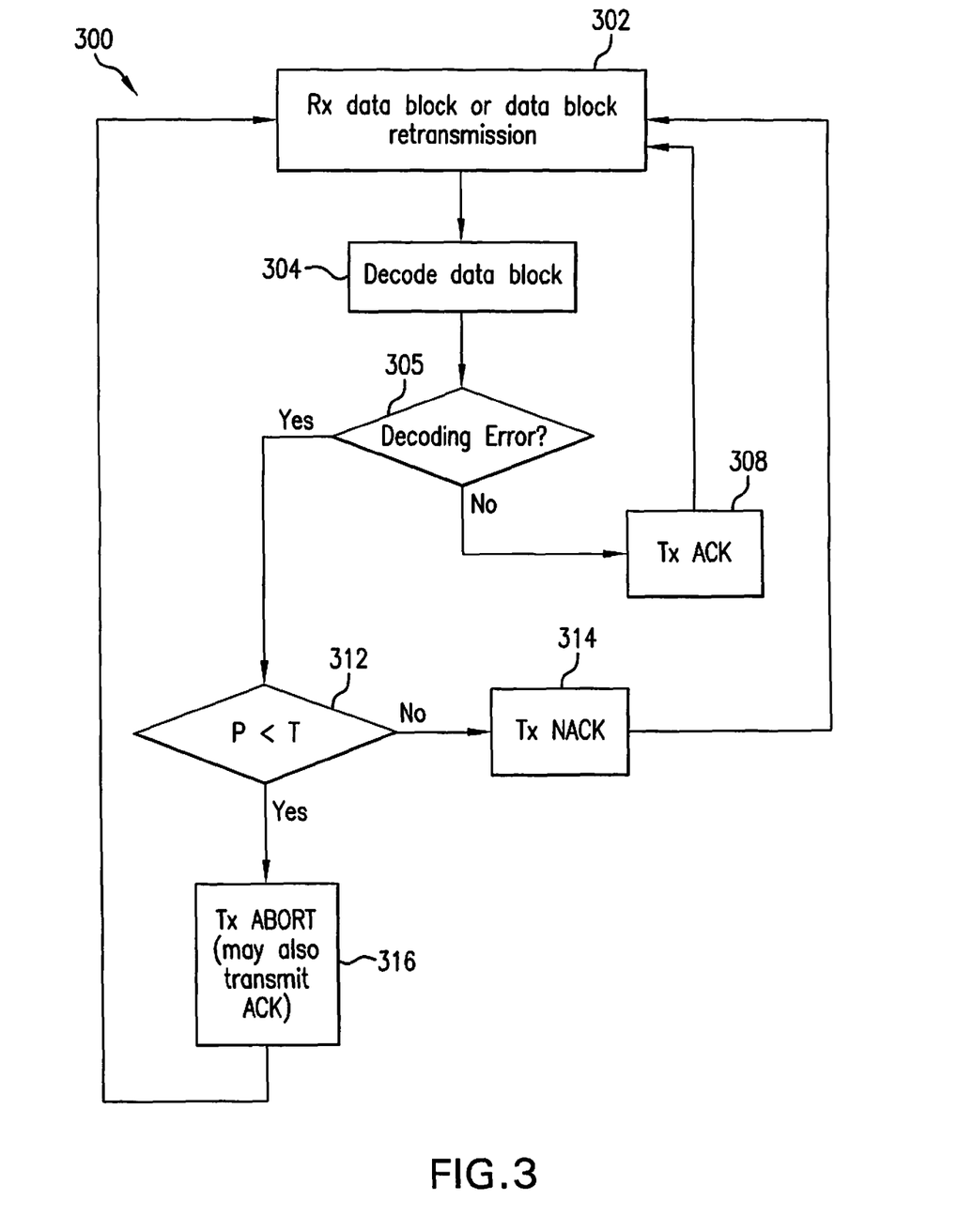
FIG. 3 is a flow chart illustrating a process according to some embodiments of the invention.

Referring now to FIG. 3, FIG. 3 is a flow chart illustrating an improved retransmission process 300, according to some embodiments of the invention, that is performed by a MAC layer 122 in the receiver (e.g., MAC layer 122(a) or MAC layer 122(b)). Process 300 begins in step 302, where the MAC layer in a receiver receives a data block (or data related to a data block) transmitted from a MAC layer in the transmitter. In step 304, the MAC layer tries to decode the data block using the data received in step 302. In step 305, the MAC layer determines whether it successfully decoded the data block. If so, process 300 proceeds to step 308, where the MAC layer transmits an ACK to the MAC layer in the transmitter. Otherwise, the MAC layer in the receiver will transmit to the MAC layer in the transmitter a NACK (step 314) or an abort message (316).

For example, in some embodiments, if the MAC layer in the receiver was not able to decode the data block, process 300 proceeds to step 312, where the MAC layer computes a value P and compares P to a threshold T. If P is less than T, the process 300 proceeds to step 316, where the MAC layer transmits the abort message indicating that the data block is aborted—i.e., indicating that the MAC layer determined that it is not probable that the MAC layer will be able to decode the data block; otherwise process 300 proceeds to step 314, where the MAC layer transmits the NACK.

In some embodiments, the abort message consists of a dedicated control element (e.g., a dedicated MAC control element). In other embodiments where the UE is the receiver, the abort message is transmitted via a channel state report (e.g., a channel quality indicator (CQI) report or other channel state report).

In some embodiments, the abort message indicates the HARQ process in the MAC layer of the receiver that attempted to decode the data. This information can be used by the MAC layer in the transmitter to identify the data block with which the abort message is associated. The abort message may also contain information identifying the time at which the HARQ process failed to decode the data block, which information can be used by the MAC layer in the transmitter to identify the data block with which the abort message is associated.

Figure 10:
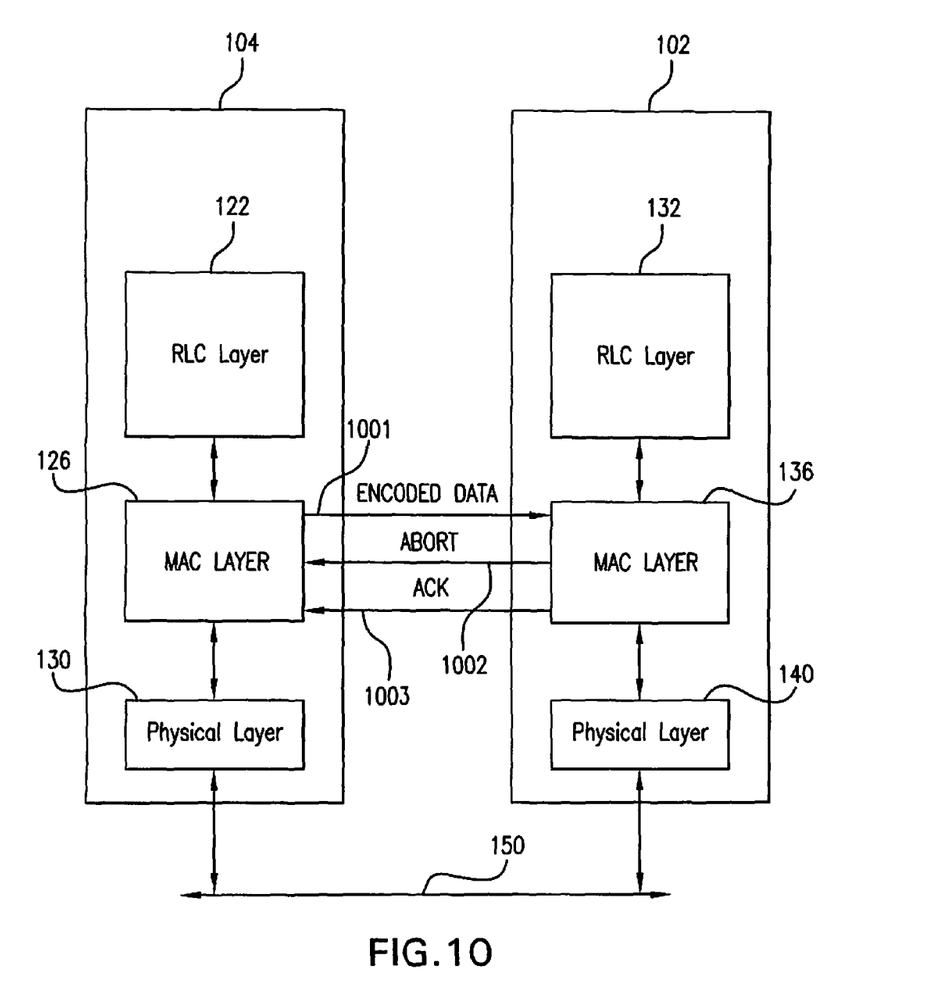
FIG. 10 illustrates a functional block diagram of some components of a UE and a functional block diagram of some components of a base station according to another example embodiment.

In some embodiments, in step 316, in addition to transmitting the abort message, the MAC layer also transmits an ACK to cause the MAC layer in the transmitter to cease transmissions of the data block. This feature is illustrated in FIG. 10, which shows receiver 102 transmitting to transmitter 104 an abort message 1002 and an ACK 1003 in response to receiving encoded data block 1001, not being able to decode the encoded data block 1001 and determining that P is less than T. In some embodiments, rather than send an ACK a NACK is sent.

As indicated above, in step 312, the MAC layer in the receiver computes a value P. In some embodiments, P is a decoding probability. For example, P may be a value representing a probability that the MAC layer in the receiver will be able to decode the data block within K retransmission attempts by the MAC layer in the transmitter (K>0). If P is less than the predefined threshold T, this means that it is futile for the MAC layer in transmitter to continue to transmit to the MAC layer in the receiver the data block or information for assisting the MAC layer in the receiver in decoding the data block.

In some embodiments, P is a function of decoder metrics (e.g., soft decoder metrics) that indicate how close the MAC layer in the receiver was to successfully decoding the data block. For example, in some embodiments, for each retransmission of the data block, the MAC layer (1) produces and records a decoder metric indicating how close the MAC layer was to successfully decoding the data block and (2) uses this information to determine P. For instance, by recording such decoder metrics, the MAC layer in the receiver can determine whether the decoding of one retransmission attempt was closer to success than the decoding of a previous retransmission attempt by examining the soft decoder metric growth between transmission attempts. The metric growth behavior is an indicator of whether it is likely that the data eventually will be correctly decoded or not. A slow growth can be considered to indicate that the radio conditions are insufficient for correct decoding even after numerous transmission attempts. A fast growth can be considered to indicate that the data will eventually be correctly decoded. Accordingly, the value P can be a function of the change in the decoder metrics.

Figure 8:
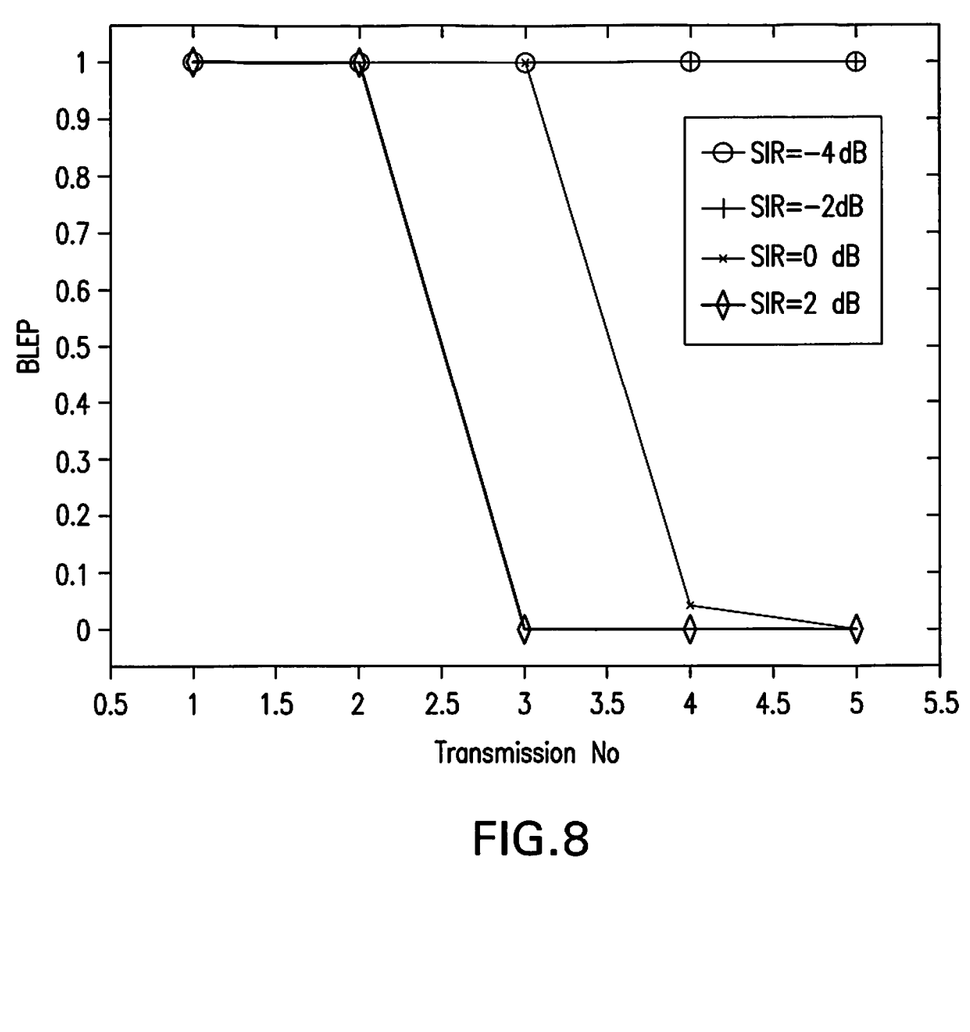
FIG. 8 illustrates block error probability per transmission attempt when the radio condition in terms of SIR is constant over time, and using Chase combining (identical data blocks are retransmitted at every attempt).

In other embodiments, P (the decoding probability) may be also be a function of a value related to a radio condition. For example, the value related to the radio condition may be value identifying or derived from a signal-to-interference ratio (SIR) (e.g., a value identifying an estimate of an average SIR). For instance, a model may be created that relates radio conditions in terms of SIR to P (or the block error probability (BLEP), which is the complimentary quantity—i.e., BLEP=1−P). Such a model can be derived using simulators and detailed descriptions of the modulation and coding in the specifications. More accurate models can relate the SIR distribution (more general, the statistical properties of SIR) to the BLEP. In one embodiment, P is equal to an estimate of an effective SIR over multiple transmission attempts, which estimate may be based on estimated SIR statistics from completed transmission attempts. For example, the decoding probability is considered insufficient after K transmission attempts, if average SIR over $K_1 < K$ transmission attempts is less than $SIR_{thres}$. In one example related to the specific transport format in FIG. 8, the decoding probability is predicted insufficient if average SIR is less than or equal to −2 dB.

Figure 9:
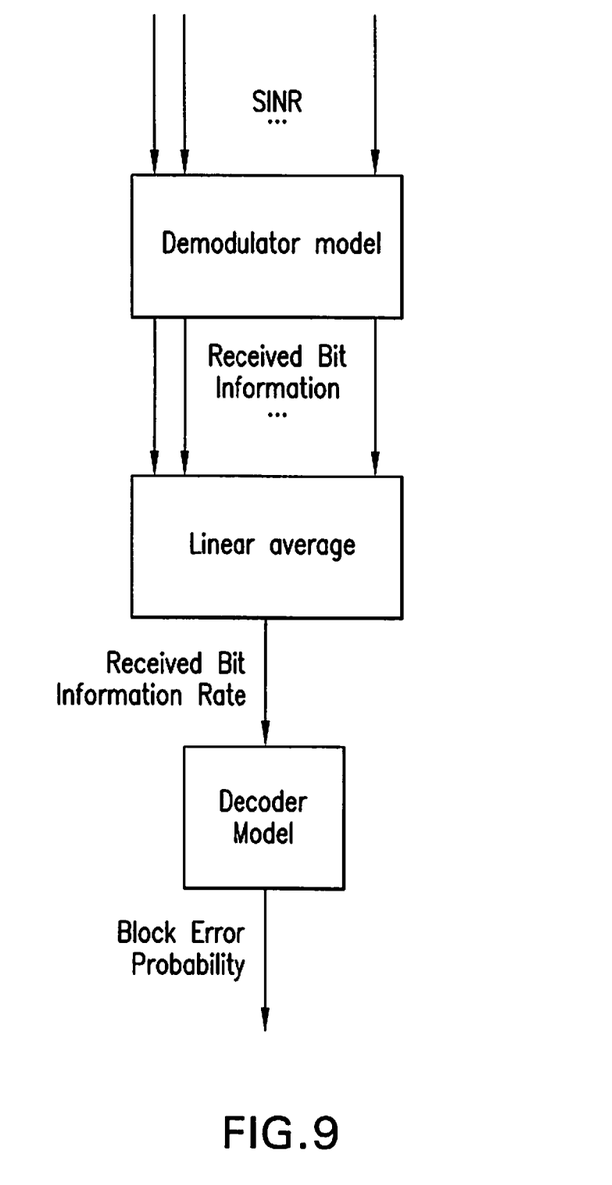
FIG. 9 illustrates link performance modeling separated into demodulator and decoder modeling.

When considering decoding of data after multiple transmission attempts, it is instructive to separate the modeling in two parts—one that depends on the modulation, and one that depends of the channel coding. This is applicable, when the coding gain is different after each transmission attempt, while the modulation is the same. FIG. 9 illustrates the modeling in one exemplifying embodiment. For each block of data, the received bit information is determined through a mapping from SINR. One such mapping is the channel capacity by Shannon ($C=\log_2(1+SINR)$[bits/symbol]). Then the received bit information rate is determined as the linear average over consecutive data blocks. This is used in a second mapping to block error probability in a decoder model. The received bit information rate is linear considering the received bit information bit rate of past transmission attempts. This fact facilitates prediction of the information rate after subsequent transmission attempts, for example assuming that the radio condition remains unchanged.

Figure 4:
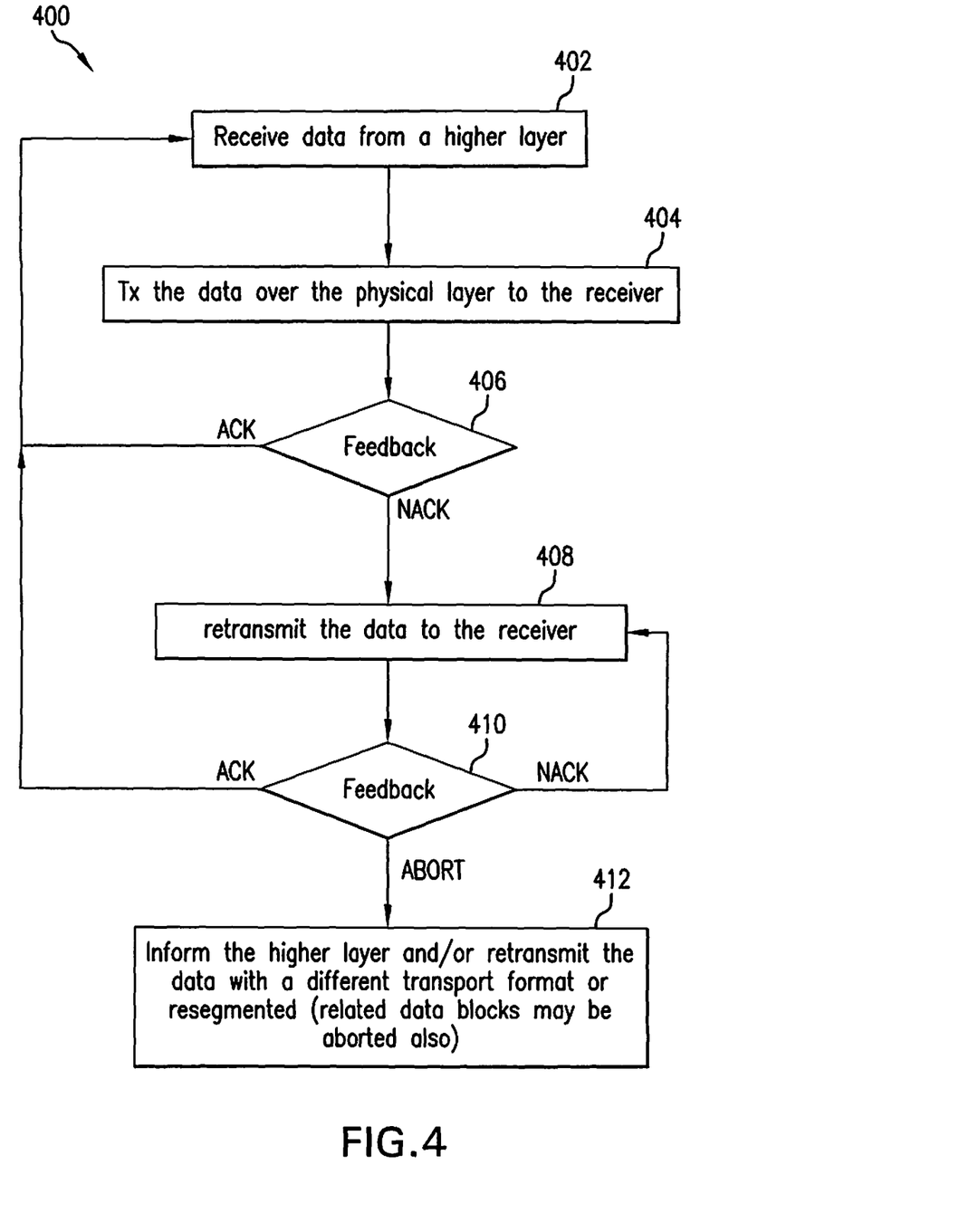
FIG. 4 is a flow chart illustrating a process according to some embodiments of the invention.

Referring now to FIG. 4, FIG. 4 is a flow chart illustrating a process 400, according to some embodiments, that is performed by a transmitting MAC layer. Process 400 may begin in step 402, where the transmitting MAC layer receives a data unit from a higher layer (e.g., the RLC layer), which received the data unit from a higher layer (e.g., a network layer). In step 404, the MAC layer transmits a data block (e.g., encoded data from the data unit) to a MAC layer in the receiver. In step 406, the MAC layer in the transmitter receives feedback regarding the data block from the MAC layer in the receiver. If the feedback is an ACK, the process 400 returns to step 402. If the feedback is a NACK, the process 400 returns to step 408.

In step 408, the transmitting MAC layer "retransmits" the data block. That is, for example, the transmitting MAC layer transmits again the data block transmitted in step 404 as if it were a new data block and/or transmits information to assist the MAC layer in the receiver in decoding the previously sent data block (e.g., other coded bits that strengthen the coding of the data block).

In step 410, the transmitting MAC layer receives feedback from the MAC layer in the receiver. If the feedback is an ACK, process 400 proceeds back to step 402. If the feedback is a NACK, process 400 proceeds back to step 408. If the feedback is an abort message, process 400 proceeds to step 412. As discussed above with reference to step 316, it is possible that the MAC layer in the receiver may send two feedback messages concerning a single data block (e.g., an abort message and an ACK). Thus, it possible that step 410 is repeated without the MAC layer in the transmitter having to transmit anything further to the MAC layer in the receiver. Hence, the MAC layer in the transmitter may receive from the corresponding MAC layer in the receiver a first feedback message (e.g., an ACK) and a second feedback message (e.g., an abort message), both of which are transmitted by the MAC layer in the receiver in response to it receiving and processing the data block. In some embodiments, the first feedback message is received before the second feedback message.

In step 412, in response to receiving an abort message, the MAC layer in the transmitter determines the data block to which the abort message pertains. As discussed above, to facilitate this determination, the abort message may contain a time reference. The time reference will facilitate the determination in the embodiments where the MAC layer in the transmitter and the MAC layer in the receiver have a common time reference. In other embodiments where the MAC layer in the transmitter and the MAC layer in the receiver have a common time reference, the MAC layer in the transmitter may determine the data block that has been aborted by the MAC layer in the receiver based on the time at which the abort message was received by the MAC layer in the transmitter.

In step 414, the MAC layer in the transmitter informs the higher layer that the identified data block has been aborted and/or retransmits the data block using a different transport format (e.g., a transmission format adapted to the current radio conditions) or segmentation. Related data blocks (e.g., data blocks belonging to the same data unit) may be aborted also in step 414.

Figure 5:
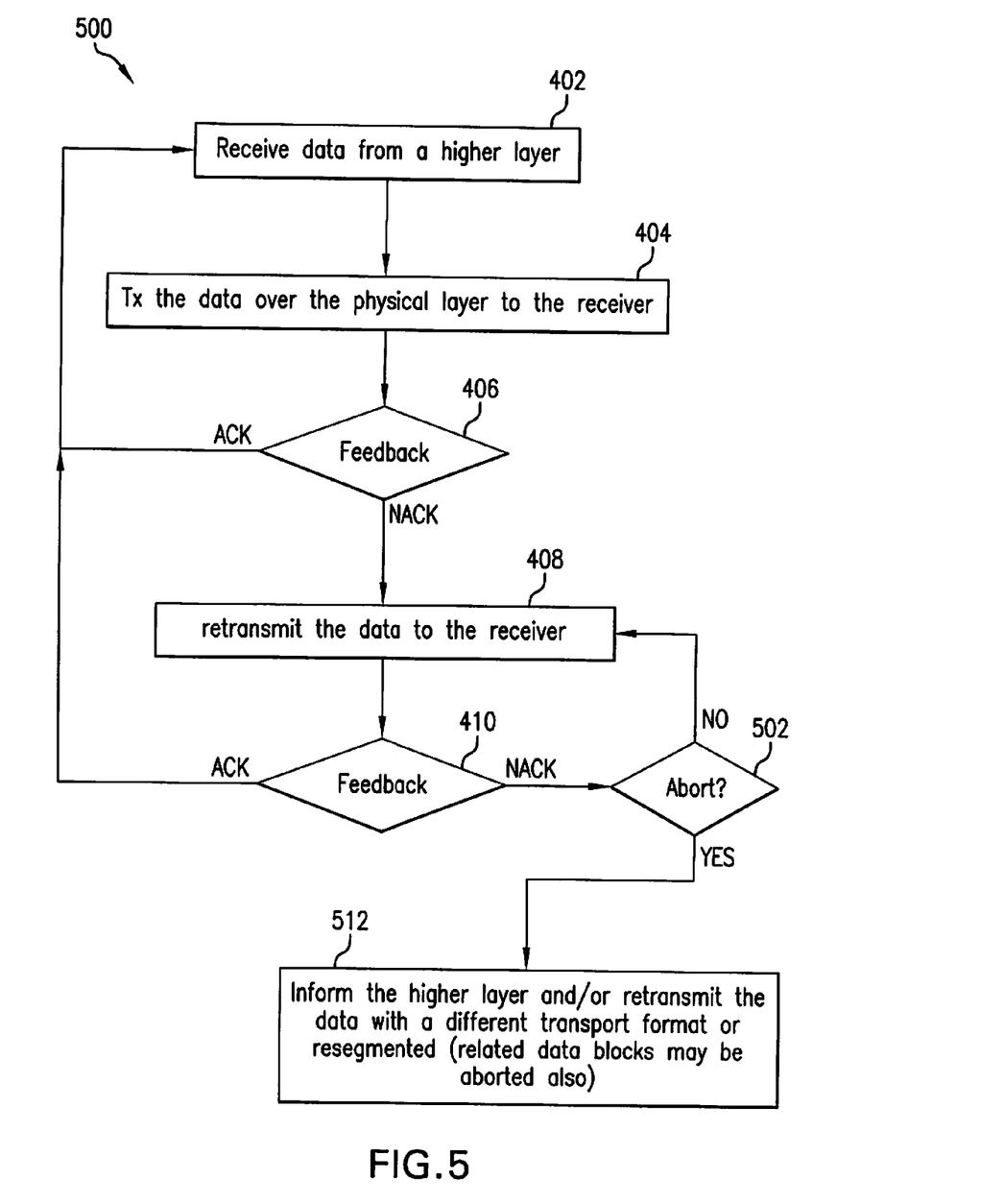
FIG. 5 is a flow chart illustrating a process according to some embodiments of the invention.

Referring now to FIG. 5, FIG. 5 is a flow chart illustrating a process 500, according to some embodiments, that is performed by a transmitting MAC layer. Process 500 is identical to process 400 except that if a NACK is received in step 410, the process proceeds to step 502 rather than proceeding back to step 408. In step 502, the transmitting MAC layer determines whether it would be futile to retransmit the data (i.e., it would be futile to repeat step 408). If the MAC layer determines that it would not be futile, the process return to step 408, otherwise it proceeds to step 512. In step 512, the transmitting MAC layer informs the higher layer that an abort was determined and/or retransmits the data using a different transport format or segmentation (related data blocks may be aborted also). In some embodiments, the transmitting MAC layer determines whether it would be futile to retransmit the data based on radio condition reports transmitted from the receiver (e.g., channel quality indicator (CQI) reports). For example, a radio condition report or reports indicate that there is a significant degradation in the radio channel quality, then the MAC layer may determine that it is futile to retransmit the data.

Figure 6:
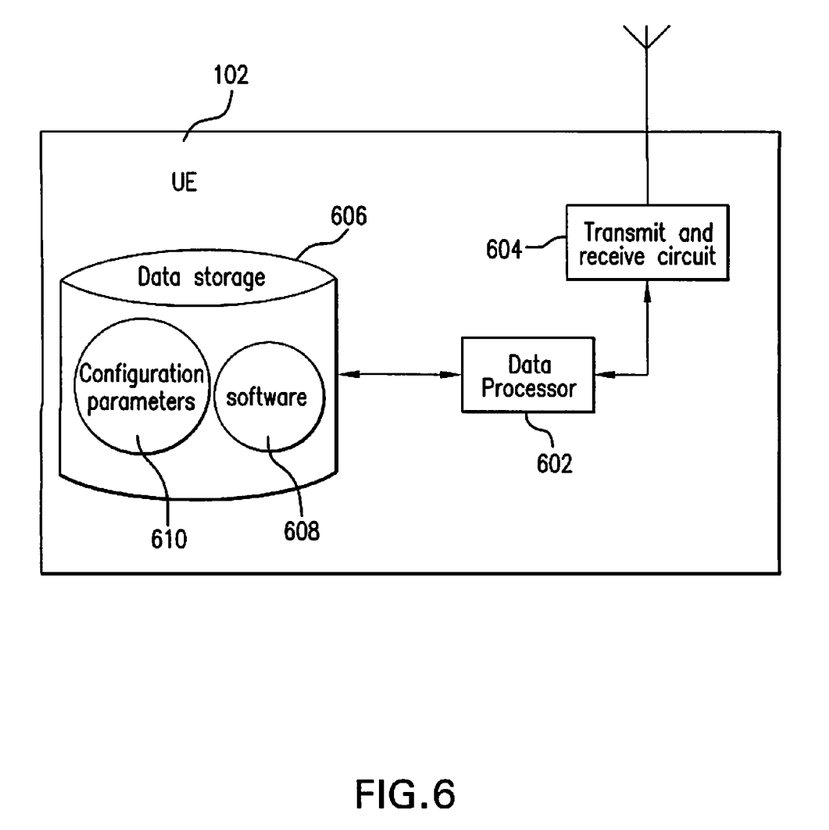
FIG. 6 is a functional block diagram of a UE according to some embodiments of the invention.

Referring now to FIG. 6, FIG. 6 is a functional block diagram of UE 102 according to some embodiments of the invention. As shown, UE 102 may comprise a data processing system 602 (e.g., one or more microprocessors), a data storage system 606 (e.g., one or more non-volatile storage devices) and computer software 608 stored on the storage system 606. Configuration parameters 610 (e.g., the above mentioned thresholds) may also be stored in storage system 606. UE 102 also includes transmit/receive (Tx/Rx) circuitry 604 for transmitting data to and receiving data from base station 104. Software 608 is configured such that when processor 602 executes software 608, UE 102 performs steps described above (e.g., the steps described above with reference to the flow charts shown in FIGS. 3, 4 and/or 5).

For example, software 608 may include: (1) computer instructions for determining that it is not possible to decode a data block transmitted from a protocol layer in a transmitter; (2) computer instructions for determining that it is not probable that the data block can be decoded even if the protocol layer in the transmitter retransmits the data block one or several times; (3) computer instructions for signaling to the protocol layer in the transmitter first feedback information indicating that the data block was received; and (4) computer instructions for signaling to the corresponding protocol layer in the transmitter second feedback information pertaining to the data block in response to the determination that it is not probable that the data block can be decoded, the second feedback information including information related to the reception time of the data block and indicating that the data block is aborted.

Figure 7:
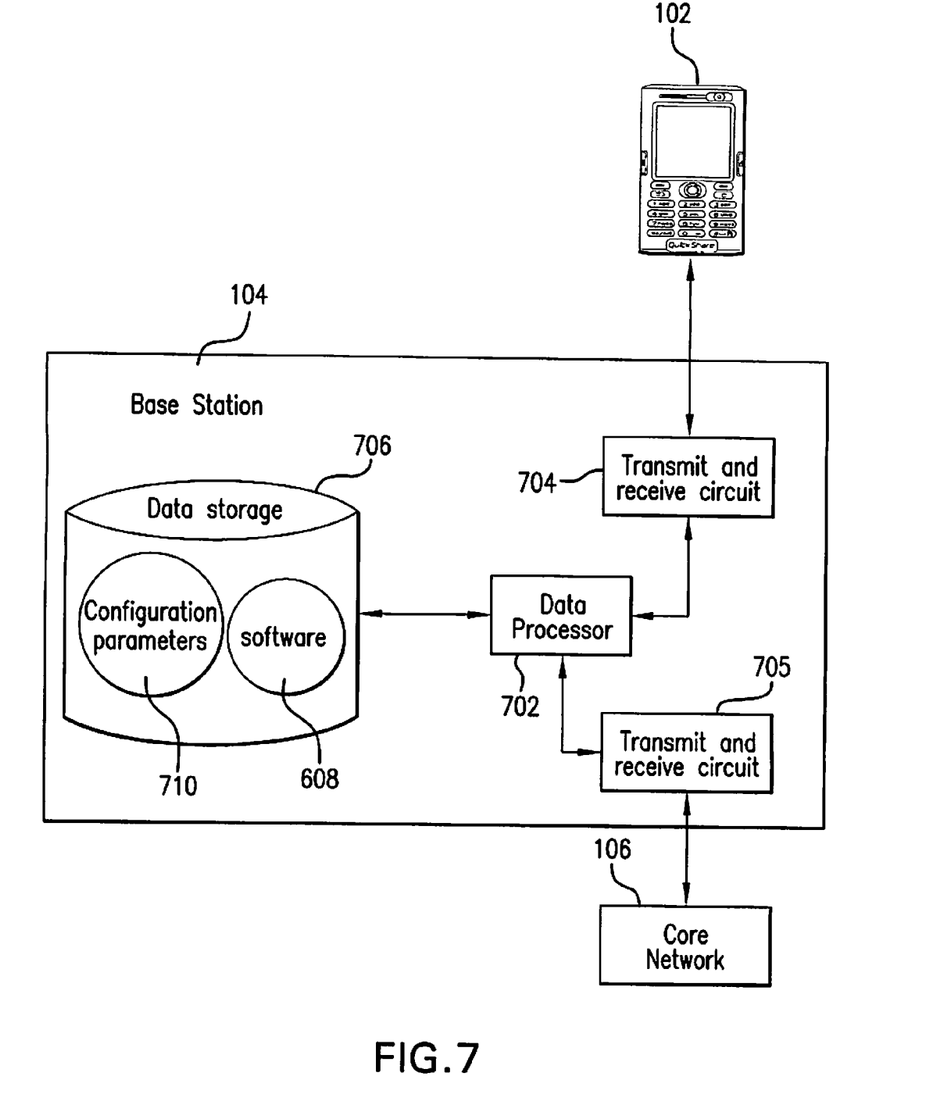
FIG. 7 is a functional block diagram of a base station according to some embodiments of the invention.

Referring now to FIG. 7, FIG. 7 is a functional block diagram of base station 104 according to some embodiments of the invention. As shown, base station 104 may comprise a data processing system 702 (e.g., one or more microprocessors), a data storage system 706 (e.g., one or more non-volatile storage devices) and computer software 608 stored on the storage system 706. Configuration parameters 710 (e.g., the above mentioned thresholds) may also be stored in storage system 706. Base station 104 also includes transmit/receive (Tx/Rx) circuitry 704 for transmitting data to and receiving data from UE 102 and transmit/receive (Tx/Rx) circuitry 705 for transmitting data to and receiving data from, for example, core network 106.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A retransmission method, comprising:
    a second device receiving a medium access control (MAC) layer data block from a first device;
    the second device determining that decoding of the MAC layer data block was unsuccessful;
    the second device sending a retransmission request to the first device indicating a request for re-transmission of the MAC layer data block;
    the second device receiving a retransmission of the MAC layer data block from the first device;
    the second device determining that decoding of the MAC layer data block was unsuccessful after receiving the retransmission;
    the second device determining that further retransmissions are not likely to result in successful decoding of the MAC layer data block, wherein determining that further retransmissions are not likely to result in successful decoding of the MAC layer data block is based on one or more soft decoding metrics; and
    the second device sending an indication that the first device should abort further re-transmission of the MAC layer data block, wherein the indication is sent prior to reaching a maximum allowed number of re-transmissions for the MAC layer data block.

2. The method of claim 1, wherein an acknowledgement (ACK) is sent along with the indication that the first device should abort further re-transmission of the MAC layer data block.

3. The method of claim 1, the indication that the first device should abort further re-transmission of the MAC layer data block is a MAC layer message.

4. The method of claim 1, wherein the indication that the first device should abort further re-transmission of the MAC layer data block is not an acknowledgement (ACK) or a negative acknowledgement (NACK).

5. A communication device, comprising:
a processor configured to at least:
receive an medium access control (MAC) layer data block from a first device;
determine that the decoding of the MAC layer data block was unsuccessful;
send a retransmission request to the first device indicating a request for re-transmission of the MAC layer data block;
receive a retransmission of the MAC layer data block from the first device;
determine that the decoding of the MAC layer data block was still unsuccessful after receiving the retransmission;
determine that further retransmissions are not likely to result in successful decoding of the MAC layer data block, wherein determining that further retransmissions are not likely to result in successful decoding of the MAC layer data block is based on one or more soft decoding metrics; and
send an indication that the first device should abort further re-transmission of the MAC layer data block, wherein the indication is sent prior to reaching a maximum allowed number of re-transmissions for the MAC layer data block.

6. The communication device of claim 5, wherein the indication that the first device should abort further re-transmission of the MAC layer data block is not an acknowledgement (ACK) or a negative acknowledgement (NACK).

7. The communication device of claim 5, wherein the processor is configured to send an acknowledgement (ACK) along with the indication that the first device should abort further re-transmission of the MAC layer data block.

8. The communication device of claim 5, wherein the indication that the first device should abort further re-transmission of the MAC layer data block is a MAC layer message.

\* \* \* \* \*